United States Patent Office 3,245,957
Patented Apr. 12, 1966

3,245,957
PROCESS OF REACTING AN ISOCYANATE WITH AN ACTIVE HYDROGEN COMPOUND IN THE PRESENCE OF AN ANTIMONITE CATALYST
Raymond R. Hindersinn, Lewiston, N.Y., and Stephen M. Creighton, Edmonton, Alberta, Canada, assignors to Hooker Chemical Corporation, Niagara Falls, N.Y., a corporation of New York
No Drawing. Filed Aug. 18, 1964, Ser. No. 390,445
7 Claims. (Cl. 260—75)

This invention relates to the catalysis of the reaction between isocyanates and compounds containing one or more active hydrogen atoms by certain antimony compounds.

This application is a continuation-in-part of copending application Serial Number 803,820, filed April 3, 1959, now abandoned.

Organic amines are conventionally used as catalysts for the reaction between isocyanates and active hydrogen-containing compounds. Primary and secondary amines are relatively poor catalysts because they react with the isocyanates, thereby causing a removal of the primary and secondary amine from the system. Although tertiary amines are not reactive with isocyanates when residual amines are allowed to remain in the system, they tend to promote hydrolysis of the resulting compositions. In addition to this, residual amines release objectionable odors. Furthermore, to obtain very fast reactions in some systems, large amounts of these amines are required to adequately catalyze the reaction.

Accordingly, an object of the invention is to provide catalysts for the reaction between isocyanates and active hydrogen-containing compounds, which catalysts are generally unreactive with isocyanates under the conditions of the reaction; do not tend to promote significant hydrolysis of the resulting compositions; and do not release objectionable odors. Another object of the invention is to provide catalysts for the reaction between isocyanates and compounds which contain one or more active hydrogen atoms in the process wherein the catalyst can be used in small quantities and still exhibit substantial catalytic effect. Further objects of the present invention will be apparent from the following detailed specification.

In accordance with the invention, we have found that antimony alcoholates catalyze the reaction between a compound containing the radical —N=C=O and an active hydrogen-containing compound. The metallic compounds of the invention have many advantages over the compounds utilized by the prior art to catalyze the reaction between isocyanates and compounds which contain one or more active hydrogen atoms. These compounds frequently exhibit greater catalytic activity than the compounds normally used by the prior art. This advantage enables greater control over the reaction and allows the use of very small quantities of catalyst to obtain substantial catalytic effect. In addition, most of the metallic compounds of the present invention are unreactive with isocyanates under the conditions of the reaction.

Furthermore, because of the neutral character of most of the metallic compounds of the invention, they do not contribute significantly to the hydrolytic instability of the resulting compositions. The metallic compounds of the present invention do not release objectionable odors, as do many of the catalytic compounds of the prior art. They are generally soluble in the reaction medium at ambient temperatures.

The antimony compounds encompassed by the invention include both the trivalent and pentavalent antimony alcoholates. Illustrative of classes of compounds contemplated are the following: the tris (hydrocarbyl) antimonites and the tris (hydrocarboxy) antimony dihalides. The hydrocarbon radicals can be alkyl, aryl, and aralkyl, and can be substituted by halogen atoms. The hydrocarbon radicals preferably have one to eight carbon atoms. The halogen substituents on the antimony and carbon atoms are preferably chlorine, bromine and mixtures thereof.

Exemplificative of specific compounds contemplated are the following: tris (2-chloroethyl) antimonite, tris (2-chloropropyl) antimonite, tris (2-chlorobutyl) antimonite, tris (2-chloro-2-phenylethyl) antimonite, tris (2-ethylhexyl) antimonite, tris (n-octyl) antimonite, tribenzyl antimonite, triphenyl antimonite, tris (2-chloroethoxy) antimony dibromide, tris (2-chloropropoxy) antimony dibromide, tris (2,3-dichloropropoxy) antimony dibromide, tris (2-chloropropoxy) antimony dichloride, tris (2,3-dichloropropoxy) antimony dichloride, tris (2-chloro-butyoxy) antimony dichlororide, tris (2-ethylhexoxy) antimony dibromide, tris (n-octoxy) antimony dibromide, tribenzoxy antimony dibromide and tris (2-chloro-2-phenylethoxy) antimony dibromide. In addition, mixtures of the catalysts of the invention can be used.

The compounds prepared by the process of the present invention, i.e., the raction products of an isocyanate and an active hydrogen-containing compound, find utility in many applications. For example, they are useful in the preparation of polyurethane foams, coatings, adhesives, chemical intermediates and the like.

The metallic compounds of the present invention exhibit greater catalytic activity than the catalysts of the prior art. In the preparation of polyurethane foams, for example, the metallic compounds of the present invention have significantly greater catalytic activity than N-methyl morpholine (a standard catalyst for this purpose), based on equal molar quantities of nitrogen and metal.

Active hydrogen-containing compounds vary in their reactivity with isocyanates. The amount of catalyst used will, of necessity, vary with the reactivity of the active hydrogen-containing compound. Normally, the metallic compounds of the present invention are employed in an amount from about 0.01 to about 1 weight percent based on the weight of reactants to adequately catalyze the reaction between an isocyanate and an alcohol-containing compound, noting, of course, that the more catalyst employed, the greater the catalytic effect. In the reaction between an isocyanate and an alcohol-containing compound, if greater than 0.5 percent by weight of the metallic compounds of the present invention are used in a batch system, the catalytic effect is normally too great to allow for convenient handling; in a continuous type system where extraordinary catalytic effect is required or can be tolerated, greater than 0.5 percent can be used.

The compositions catalyzed by the present invention are the reaction products of organic isocyanates and active hydrogen-containing compounds. Any monoisocyanate or polyisocyanate can be employed, i.e., any organic compound which contains the radical —N=C=O.

The aromatic isocyanates are preferred because they are more reactive and less toxic than the aliphatic members. Typical isocyanates include the following: phenyl isocyanate, alpha-naphthyl isocyanate, 4-tolylene isocyanate, n-hexyl isocyanate, 2,4-tolylene diisocyanate, 2,6-tolylene diisocyanate, methylene-bis-(4-phenylisocyanate), 3,3'-bitolylene-4,4'-diisocyanate, 3,3'-dimethoxy 4,4'-biphenylene diisocyanate, 1,5-naphthalene diisocyanate, 2,4-chlorophenyl diisocyanate, hexamethylene diisocyanate, ethylene diisocyanate, trimethylene diisocyanate, tetramethylene diisocyanate, pentamethylene diisocynate, decamethylene diisocyanate, 1,3-cyclopentylene diisocyanate, 1,2-cyclohexylene diisocyanate, 1,4-cyclohexylene diisocyanate, cyclopentylidene diisocyanate, cyclohexylidene diisocyanate, p-phenylene diisocyanate, m-phenylene diisocyanate, 4,4'-diphenyl propane diisocyanate, 4,4'-diphenyl methane diisocyanate, 1-methyl-2,4-phenylene diisocyanate, 4,4'-diphenylene diisocyanate, 1,2-propylene diisocyanate, 1,2-butylene diisocyanate, 2,3-butylene diisocyanate, 1,3-butylene diisocyanate, ethylidene diisocyanate, propylidene diisocyanate; butylene diisocyanate; 1,3,5-benzene triisocyanate; 2,4,6-monochlorobenzene triisocyanate; 4,4',4''-triphenylmethane triisocyanate; 2,4,4'-diphenyl triisocyanate; polymethylene polyphenylisocyanate; the liquid reaction products of (1) diisocyanates and (2) polyols or polyamines; and the like. In addition, isothiocyanates and mixtures of isocyanates can be employed. Also contemplated are the many impure or crude polyisocyanates that are commercially available such as crude mixtures of methylene bis(4-phenylisocyanate).

The term "active hydrogen atom" refers to hydrogens which display activity according to the well-known Zerewitinoff test as described by Kohler in Journal of the American Chemical Society, 49, 3181 (1927). Such active hydrogen-containing compounds are any organic compounds containing one or more active groups. Typical compounds contemplated include the following classes of compounds: alcohols; phenols; thiols; amines; amides; carboxylic acids; etc., as well as compounds containing mixtures of the above groups. Illustrative compounds include: ethyl alcohol, methyl alcohol; ethylene glycol, diethylene glycol; hexamethylene glycol; decamethylene glycol; glycerol; 1,2,6-hexanetriol; resorcinol; hydroquinone; cyclohexanol; 1,2-ethanediol; decamethylene dithiol; thioresorcinol; ethylamine; ethanolamine; diethanolamine; triethanolamine; N-ethylethanolamine; m-phenylenediamine; propylenediamine; ethylenediamine; 2,4-tolylenediamine; bis(4-aminophenyl) methane; p-aminophenol; hexamethylene diamine; adipamide; 4-aminobenzamide; 1,4-cyclohexanedisulfonamide; 1,3-propanedisulfonamide; succinamide; 1,4-butanedisulfonamide; benzoic acid; acetic acid; citric acid; polyvinyl mercaptan; phthalic acid; adipic acid; and the like.

Generally preferred as the active hydrogen-containing compound are the hydroxyl-containing polymers having a hydroxyl number of about 25 to 900, such as the alkyd resins which are the reaction product of a polyhydric alcohol and a polycarboxylic compound. These alkyd resins are generally preferred in the present invention. The alkyd resins can be reacted with an isocyanate in the presence of a catalyst of the present invention and also in the presence of a foaming agent, to give a polyurethane foam. For example, a useful polyurethane foam of desirable properties can be easily prepared from an alkyd resin containing an excess of hydroxyl groups.

Also contemplated as the active hydrogen-containing compound of the invention are the polyethers, which are the reaction products of (1) either a polyhydric alcohol, a polycarboxylic acid or a polyphenolic compound, and (2) a monomeric 1,2-epoxide possessing a single 1,2-epoxy group.

The polycarboxylic compound used to prepare the alkyd resins or the polyethers can be either a polycarboxylic acid, a polycarboxylic acid anhydride, a polycarboxylic acid ester, a polycarboxylic acid halide or mixtures thereof. The carboxylic compounds can be aliphatic, cyclo aliphatic, aromatic, or heterocyclic and either saturated or unsaturated. Among the polycarboxylic compounds which can be used to form the polyester are: maleic acid; fumaric acid; phthalic acid; isophthalic acid; terephthalic acid; tetrachlorophthalic acid, aliphatic acids such as oxalic, malonic, succinic, glutaric and adipic; 1,4-cyclohexadiene-1,2-dicarboxylic acid and the like. Additional polycarboxylic compounds which can be used to form the polyester are Diels-Alder adducts of hexahalocyclopentadiene and a polycarboxylic compound, wherein the halogen is selected from the group consisting of chlorine, bromine, fluorine and mixtures thereof, for example: 1,4,5,6,7,7-hexachlorobicyclo-(2.2.1)-5-heptene-2,3-dicarboxylic acid; 1,4,5,6-tetrachloro-7-7-difluorobicyclo-(2.2.1)-5-heptene-2,3 - dicarboxylic acid; 1,4,5,6,7,7-hexabromobicyclo-(2.2.1)-5-heptene-2,3-dicarboxylic acid; 1,4,5,6-tetrabromo-7,7-difluorobicyclo-(2.2.1)-5-heptene-2,3-dicarboxylic acid; and the like. Mixtures of any of the above polycarboxylic compounds can be employed.

In order to obtain a satisfactory rigid foam, at least a portion of the total polyhydric alcohol component should consist of a polyhydric alcohol containing at least three hydroxyl groups. This is desired to provide a means for branching the polyester. Where an even more rigid structure is desired, the whole alcohol component may be made up of a trifunctional alcohol such as glycerol. Where a less rigid final product is desired, a difunctional polyhydric alcohol such as ethylene glycol or 1,4-butanediol may be utilized as that part of the polyhydric alcohol component. Other glycols such as diethylene glycol, triethylene glycol, propylene glycol, dipropylene glycol, other polypropylene glycols, butylene glycols, polybutylene glycols, and the like can also be used. Among the polyhydric alcohols which can be used are glycerol, hexanetriol, butanetriol, trimethylol propane, trimethylol ethane, pentaerythritol, mannitol, sorbitol, cyclohexanediol-1,4 glycerol monoethyl ether and the like.

Polyphenolic compounds which can be employed in producing the polyethers are the reaction products of phenolic compounds with aldehydes, such as phenol-formaldehyde novolac resins.

Examples of monomeric 1,2-epoxides used in preparing the polyethers include ethylene oxide, propylene oxide, butylene oxide, isobutylene oxide, 2,3-epoxyhexane, 3-ethyl-2,3-epoxyoctane, epichlorohydrin, epibromohydrin, styrene oxide, glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate and the like.

Any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of —30 to 50 degrees centigrade, and the mixtures thereof, for example, trichlorofluoromethane, trichlorotrifluoroethane, dichloromonofluoromethane, monochloroethane, monochloromonofluoroethane, difluoromonochloroethane, and difluorodichloroethane.

Another foaming system that is suitable for carrying out the foaming reaction at an elevated temperature is found in Unites States Patent 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid;

and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents can be employed.

In preparing the polyurethane compositions of this invention, the hydroxyl containing polymer, either alkyd resin or polyether, and polyisocyanate are preferably reacted in a ratio sufficient to provide about eighty-five to one hundred and fifteen percent of isocyanato groups with respect to the total number of hydroxyl and carboxyl groups present in the hydroxyl - containing polymeric material (and the foaming agent, if one is provided). The reaction temperature generally ranges from about twenty to about one hundred and twenty degrees centigrade, although higher and lower temperatures can be used.

The following is an exemplificative discussion of the preparation of such an alkyd resin, wherein, for illustrative purposes, the alkyd resin was prepared from a mixture of polyesters. The first of the polyesters was prepared from a mixture of four moles of 1,4,5,6,7,7-hexachlorobicyclo-(2.2.1)-5-heptene - 2,3 - dicarboxylic acid, two moles of adipic acid, and 7.6 moles of glycerol, and cooking the mixture to an acid number of from about five to about six. The other polyester was prepared in a similar manner from a mixture of six holes of adipic acid and ten moles of trimethylol propane, and cooking the mixture to an acid number of from about zero to about one. The polyester mixture was then prepared by admixing equal parts of the above polyesters and, in addition, about ten percent by weight of tricresyl phosphate was added. One hundred sixty-five parts by weight of this alkyd mixture were reacted with three hundred and one parts by weight of a semi-prepolymer (formed by the reaction of twenty-five parts of chlorine-containing polyester and seventy-five parts of tolylene diisocyanate) in the presence of a cataylst of the present invention, for example, 2.0 parts by weight of tris(2-chloroethyl) antimonite, and ten parts by weight of water. The components were then rapidly mixed and allowed to expand and cure into a polyurethane foam.

A test has been used to evaluate the relative merits of the catalysts of the present invention. The following procedure was used. Five milliliters of cyclohexanol were added to a volumetric flask containing 6.7 millimoles of the catalyst, and the solution raised to a volume of 25 milliliters by the addition of anhydrous toluene. Phenyl isocyanate (11.91 grams) was added to a 100 milliliters volumetric flask and diluted to 100 milliliters with toluene. One hundred milliliters of a di-n-butylamine solution in toluene was similarly prepared from 13.8 grams of di-n-butylamine. The test was performed in a 125 milliliters stoppered Erlenmeyer flask by adding 10 milliliters of the isocyanate solution from a pipet, followed by 5 milliliters of the catalyst solution in cyclohexanol. The mixture was stirred continually during the addition. Exactly 3 minutes after the addition of the cyclohexanol solution, an excess of dibutylamine solution (10 milliliters) was added to quench the reaction and the mixture allowed to stir for fifteen minutes, and 50 milliliters of isopropyl alcohol added. The excess amine remaining was titrated with standard hydrochloric acid in the presence of bromophenol blue or bromocresol green indicator. The amount of isocyanate reacted with the alcohol was then calculated by standard methods. According to this test, a known quantity of cyclohexanol was added to a flask containing a known quantity of anhydrous toluene, followed by weight amounts of isocyanate and the catalyst to be tested. The reaction was allowed to proceed at room temperature for exactly three minutes in order to react only a part of the isocyanate available, whereupon an excess of di-n-butylamine was added to quench the reaction. If no catalyst is used, the amount of isocyanate unreacted in the mixture at the end of three minutes is known, i.e., one hundred weight percent of isocyanate groups are unreacted. If all of the isocyanate were allowed to react, no information could be obtained when the cataylst is added. But, if the reaction is not allowed to go to completion, the effect of the catalyst on the rate of the reaction can be determined analytically.

A blank was run without the isocyanate with all determinations. This shows the effect of the catalyst on the alcohol in order to determine the correction factor for any reaction of alcohol and catalyst. This is especially important in the case of the chlorinated-type metallic compounds of the present invention. In addition to this, the other correction factors apparent to those skilled in the art were applied.

In the following table, the difference in catalytic effect is exemplified using 0.0134 equivalent of active nitrogen or metal in every case.

| Example | Catalyst | Percent by Weight of —N=C=O Unreacted |
|---|---|---|
| 1 | None | 100.0 |
| 2 | Tris(2-chloroethyl) antimonite | 10.9 |
| 3 | Tris(2-chloropropyl) antimonite | 6.8 |
| 4 | Tris(n-octyl) antimonite | 6.0 |
| 5 | Triethylamine | 78.7 |
| 6 | N-methyl morpholine | 83.5 |

This invention can be embodied in other forms or carried out in other ways without departing from the spirit or essential characteristics thereof. The present embodiment is, therefore, to be considered as in all respects illustrative and not restrictive.

What is claimed is:

1. The process which comprises reacting together an organic compound containing the radical —N=C=O, and an active hydrogen-containing compound as determined by the Zerewitinoff method, said reaction being performed in the presence of a catalytic amount of a compound selected from the group consisting of a tris (hydrocarbyl) antimonite and a tris (halohydrocarbyl) antimonite, wherein the hydrocarbyl radicals have 1 to 8 carbon atoms and the halogen substituents are selected from the group consisting of chlorine, bromine and mixtures thereof.

2. The process which comprises reacting together an organic compound containing the radical —N=C=O, and an active hydrogen-containing compound as determined by the Zerewitinoff method, said reaction being performed in the presence of about 0.01 to about 1.0 weight percent of tris (2-chloroethyl) antimonite based on the weight of reactants.

3. The process which comprises reacting together an organic compound containing the radical —N=C=O, and an active hydrogen-containing compound as determined by the Zerewitinoff method, said reaction being performed in the presence of about 0.01 to about 1.0 weight percent of tris (2-chloropropyl) antimonite based on the weight of reactants.

4. The process which comprises reacting together an organic compound containing the radical —N=C=O, and an active hydrogen-containing compound as determined by the Zerewitinoff method, said reaction being performed in the presence of about 0.01 to about 1.0 weight percent of tris (n-octyl) antimonite based on the weight of reactants.

5. The process which comprises reacting together an organic polyisocyanate, and a hydroxyl-containing polymer having a hydroxyl number of about 25 to 900, said reaction being performed in the presence of a catalytic amount of a compound selected from the group consisting of a tris (hydrocarbyl) antimonite and a tris (halohydrocarbyl) antimonite, wherein the hydrocarbyl radicals have 1 to 8 carbon atoms and the halogen substituents are selected from the group consisting of chlorine, bromine and mixtures thereof.

6. The process of claim 5 wherein the hydroxyl-containing polymer is an alkyd resin comprising the reaction product of a polyhydric alcohol and a polycarboxylic compound.

7. The process of claim 6 wherein the polycarboxylic compound is 1,4,5,6,7,7 - hexachlorobicyclo-(2.2.1)-5-heptene-2,3-dicarboxylic acid.

References Cited by the Examiner

UNITED STATES PATENTS 2,865,869 12/1958 Hindersinn et al. _____ 260—2.5
3,061,557 10/1962 Hostettler et al. _____ 260—2.5

LEON J. BERCOVITZ, *Primary Examiner.*

DONALD E. CZAJA, *Examiner.*